United States Patent [19]

Aumann et al.

[11] Patent Number: 5,015,669
[45] Date of Patent: May 14, 1991

[54] UNDERSEAL COMPOSITION, AND PROCESS FOR THE PRODUCTION THEREOF

[75] Inventors: Gerd Aumann, Alpen-Veen; Matthias Giesen, Duisburg; Gerd Klatte, Rheinberg; Hans-Jürgen Korte, Duesseldorf, all of Fed. Rep. of Germany

[73] Assignee: Deutsche Solvay-Werke GmbH, Solingen, Fed. Rep. of Germany

[21] Appl. No.: 460,392

[22] Filed: Jan. 3, 1990

[30] Foreign Application Priority Data

Jan. 3, 1989 [DE] Fed. Rep. of Germany ....... 3900054

[51] Int. Cl.$^5$ ............................ C08K 9/00; C08K 3/26
[52] U.S. Cl. ..................................... 523/200; 523/210; 524/425; 524/567; 524/427; 524/569
[58] Field of Search ................ 523/200, 210; 524/425, 524/567, 569

[56] References Cited

U.S. PATENT DOCUMENTS 4,013,603  3/1977  Zavatti et al. ................... 524/59

FOREIGN PATENT DOCUMENTS 1229220   3/1963   Fed. Rep. of Germany .
55-165960 12/1980  Japan ............................... 524/425
62-007784  1/1987  Japan ............................... 524/425

*Primary Examiner*—Joseph L. Schofer
*Assistant Examiner*—Mark Sweet
*Attorney, Agent, or Firm*—Foley & Lardner

[57] ABSTRACT

The present invention relates to an underseal composition for motor vehicles, comprising a finely divided vinyl chloride homopolymer, copolymer, terpolymer or graft polymer, a plasticizer, a stabilizer, and a filler comprising calcium carbonate particles, wherein at least a part of said filler is provided with a surface coating formed by a surface treatment agent which comprises an unsaturated monocarboxylic acid or fatty acid having from 4 to 14 carbon atoms, or a salt thereof. The underseal composition has improved rheological properties.

31 Claims, No Drawings

UNDERSEAL COMPOSITION, AND PROCESS FOR THE PRODUCTION THEREOF

BACKGROUND OF THE INVENTION

The present invention relates to an underseal composition for motor vehicles.

Metal-coating agents or metal-coating compositions based on polyvinyl chloride, plasticizers, pigments and/or fillers, such as chalk, have already been disclosed (cf., inter alia, German Auslegeschrift 1,229,220). It has furthermore been disclosed that the processability in certain areas of application, for example the coating of metals, is accompanied by difficulties, inasmuch as requirements such as adhesive strength, in addition to good processability, must be satisfied.

Even greater demands are made on underseal compositions for motor vehicles, for example based on polyvinyl chloride, since the underseal compositions must not only be easy to apply, have good adhesion and the like, but must also have a certain resistance to chipping and other mechanical influences. It has therefore been shown that numerous plastisols, which can be employed, for example, for the coating of paper, for the production of wallpaper, for the production of floor coverings, for sheathing cables and so on, are not suitable as underseal agents or compositions.

Commonly assigned German Patent Application P 38 01 649.4, corresponding to U.S. application Ser. No. 07/299,338, discloses an underseal composition for motor vehicles, based on polyvinyl chloride, which comprises a filler comprising calcium carbonate particles, with at least a part of the filler being provided with a surface coating comprising a surface treatment agent which comprises at least one saturated or unsaturated carboxylic acid, fatty acid or substituted fatty acid having from 2 to 32 carbon atoms and containing at least one polar group in addition to at least one —COOH group, or a salt of said carboxylic acid or fatty acid. The composition displays improved rheological properties.

SUMMARY OF THE INVENTION

Accordingly, it is an object of the present invention to provide an underseal composition based on polyvinyl chloride which has improved rheological properties, including good flowability during application or during spraying.

Another object of the present invention is to provide an underseal composition which has good non-sag properties after application and good adhesion to the substrate without significant impairment of the other properties of the underseal agent.

A further object of the present invention is to provide a process for producing the foregoing underseal composition.

In accomplishing the foregoing objectives, there has been provided, in accordance with one aspect of the present invention, an underseal composition for motor vehicles, comprising: (a) a finely divided vinyl chloride homopolymer, copolymer, terpolymer or graft polymer; (b) a plasticizer; (c) a stabilizer; and (d) a filler comprising calcium carbonate particles, wherein at least a part of the filler is provided with a surface coating comprising a surface treatment agent which comprises an unsaturated monocarboxylic acid or fatty acid having from 4 to 14 carbon atoms, or a salt thereof. The composition may further comprise an adhesion promoter, a dye or colored pigment, and a solvent or diluent.

In accordance with another aspect of the present invention there is provided a process for producing an underseal composition for motor vehicles, comprising the steps of: applying to the surfaces of calcium carbonate particles, at a temperature of from about 278 to 368 K., a solution, emulsion, or suspension, which comprises at least one diluent or solvent and a surface treatment agent which comprises an unsaturated carboxylic acid or a salt thereof; filtering the treated calcium carbonate particles; drying and grinding the calcium carbonate particles; forming a filler comprising the treated calcium carbonate particles; and combining the filler with a finely divided vinyl chloride homopolymer, copolymer, terpolymer or graft polymer, a plasticizer, and a stabilizer. The filler may be further combined with an adhesion promoter, a dye or pigment, and a solvent or diluent.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF PREFERRED EMBODIMENTS

Calcium carbonate particles which have been surface-treated with the above-mentioned chemical compounds are preferably employed in underseal compositions, which are subsequently ground, in particular in order to separate agglomerates which have formed. The calcium carbonate preferably has a mean particle size of from about 0.01 $\mu$m to 20 $\mu$m, particularly preferably 0.05 $\mu$m to 5 $\mu$m. The calcium carbonate is preferably a synthetic calcium carbonate. The calcium carbonate employed has a specific surface area (BET, adsorption using nitrogen) of from about 0.5 to 100 m$^2$/g, preferably 1 to 50 m$^2$/g. It is preferably present as a filler in the underseal composition, alone or mixed with other fillers.

The unsaturated carboxylic acid employed is a mono- or polyunsaturated, preferably a diunsaturated, conjugated or non-conjugated carboxylic acid, an alkali salt thereof, preferably an ammonium salt of a mono- or diunsaturated carboxylic acid, or a mixture thereof. Preferred acids include crotonic acid, 2-pentenoic acid, 4-pentenoic acid, 2-hexenoic acid, 3-hexenoic acid, 2,4-pentadienoic acid, 3-butenoic acid and/or 3-methylcrotonic acid, and particularly preferably sorbic acid or ammonium sorbate.

According to a preferred embodiment, up to about 60% by weight (based on 100 parts by weight of the carboxylic acids employed for the surface treatment), preferably up to 40% by weight, of the mono- or polyunsaturated carboxylic acid or carboxylic acids or alkali salt of the carboxylic acid, or a mixture thereof (preferably ammonium salt of this/these carboxylic acid(s)) are replaced by a saturated and/or unsaturated monocarboxylic acid containing one polar group besides the carboxyl or carboxylate groups, the alkali salts thereof, preferably the ammonium salt, having $C_2$–$C_{32}$, and/or humic acid or an alkali salt thereof, preferably an ammonium salt.

According to a preferred embodiment, the underseal composition comprises about 10 to 60 parts by weight, preferably 25 to 45 parts by weight, of a vinyl chloride homopolymer, copolymer or terpolymer, about 10 to 60 parts by weight, preferably 20 to 45 parts by weight, of a plasticizer or plasticizer mixture, about 12 to 1 parts by weight, preferably 6 to 2 parts by weight, of at least one dye or colored pigment, of an additive and/or a processing auxiliary or added agent, preferably of an adhesion promoter and/or stabilizer, about 10 to 60 parts by weight, preferably 15 to 40 parts by weight, of at least one filler, preferably of a surface-treated calcium carbonate or of a surface-treated filler mixture comprising calcium carbonate. The calcium carbonate or the calcium carbonate present in the filler mixture is provided with about 0.3 to 12% by weight, preferably 1 to 5% by weight (based on 100 parts by weight of the surface-treated calcium carbonate or of the surface-treated filler mixture, prefrably of the calcium carbonate present therein), of at least one unsaturated carboxylic acid, fatty acid or substituted fatty acid, a salt of this compound or fatty acid derivative, preferably an ammonium salt, alkali salt or formed calcium salt of a mono- or diunsaturated monocarboxylic acid having $C_4$ to $C_{14}$, preferably $C_5$ to $C_{12}$. The aforementioned components are arranged on the surface or on part of the surface of the filler or filler mixture, preferably the surface of the calcium carbonate.

Vinyl chloride homopolymers, copolymers, terpolymers and/or graft polymers which are known per se and can be made into a paste, or mixtures of polyvinyl chloride which can be made into a paste, are employed for the underseal composition according to the invention. As vinyl chloride homopolymers, copolymers or terpolymers which can be made into a paste, finely divided suspension, emulsion or graft polymers, but preferably emulsion homopolymers, copolymers and/or terpolymers, can be employed. The vinyl chloride copolymers or terpolymers employed are vinyl chloride copolymers or terpolymers which are known per se and contain more than about 50% by weight, preferably more than 80% by weight, of polyvinyl chloride or vinyl chloride (based on 100 parts by weight of the copolymer or terpolymer), preferably vinyl chloride/acrylate, vinyl chloride/methacrylate, vinyl chloride/vinyl acetate copolymers. However, copolymers preferably having a vinyl chloride content of greater than about 90% by weight, particularly preferably greater than 95% by weight, are employed. The underseal composition is produced with concomitant use of commercially available mixers or paste mixers, for example slow mixers (kneaders) or high-speed mixers (dissolvers).

Suitable plasticizers are the plasticizers or plasticizer mixtures which are known per se, preferably alkyl, aryl or aralkyl phthalates, preferably alkyl phthalates having a chain length of $C_7$-$C_{11}$, adipates and sebacates.

A small proportion, for example up to about 10 parts by weight, preferably 0 to 5 parts by weight (based on the proportion by weight of the plasticizer) of the plasticizers can be replaced by the same amount of an organic-chemical solvent.

Additional fillers of the filler mixture which can be employed besides calcium carbonate (synthetic and/or natural calcium carbonate) are, inter alia, dolomite, talc (including microtalc), silica and/or quartz powder.

According to a preferred embodiment, the underseal composition additionally comprises very small amounts of an alkaline earth metal hydroxide and/or an alkaline earth metal oxide, preferably calcium oxide.

According to a preferred embodiment, a synthetic surface-coated calcium carbonate is present in the underseal composition, preferably prepared by introducing carbon dioxide into a calcium hydroxide suspension and subsequently surface-treating the calcium carbonate prepared with an alkali salt or ammonium salt of an unsaturated carboxylic acid, fatty acid or substituted fatty acid. During the surface treatment here, all or some of the corresponding calcium compound of these fatty acids is formed on the surface of the calcium carbonate.

The surface layer formed on the surface of the synthetic calcium carbonate after application of the treatment agent preferably comprises a calcium salt and/or alkali metal salt, and also, if appropriate, an ammonium salt, of at least one unsaturated fatty acid or carboxylic acid having $C_5$ to $C_{12}$, preferably sorbic acid.

The invention furthermore relates to a process for the production of an underseal composition for motor vehicles, where the components, comprising at least one finely divided vinyl chloride homopolymer, copolymer, terpolymer or graft polymer, at least one plasticizer, at least one stabilizer, at least one filler based on calcium carbonate or a calcium carbonate-containing filler mixture, and at least one adhesion promoter and/or one other auxiliary or added substance, and also, if appropriate, a dye, a colored pigment, a solvent and/or a diluent, are mixed with one another.

According to the invention, the calcium carbonate, preferably the synthetic calcium carbonate, is mixed and treated, before addition to the underseal composition or to one or more component(s) of the underseal composition, with a solution, emulsion or suspension, containing at least one diluent or solvent, of a surface-treatment agent in the form of a unsaturated carboxylic acid, fatty acid, substituted fatty acid, or a salt of these compounds having $C_4$ to $C_{14}$, preferably $C_5$ to $C_{12}$, at temperatures of from about 278K. to 368K., preferably 328K. to 358K. After the impregnation, the calcium carbonate with the surface layer formed on the surface is filtered off and treated, preferably dried and ground.

According to a preferred embodiment, the unsaturated carboxylic acid fatty acid, salts of the fatty acid and/or substituted fatty acid, is added to an aqueous calcium carbonate suspension, which preferably been prepared synthetically (precipitated calcium carbonate).

According to a preferred embodiment, the surface-treatment agent is added in the form of an aqueous emulsion to the aqueous calcium carbonate suspension. In a preferred embodiment, the surface-treatment agent is added in the form of its salts, preferably alkali metal salts and/or ammonium salts, to the calcium carbonate, preferably the calcium carbonate suspension, for surface treatment.

According to a preferred embodiment, the surface-treatment agent is employed in the form of the ammonium salt. All or some of the ammonium salt of the surface-treatment agent react with the calcium carbonate on the surface of the calcium carbonate particles, so that all or some of the corresponding calcium salts of the surface-treatment agent form on the surface of the calcium carbonate particles, and all or some of the resultant ammonium compounds volatilize during the reaction at the process temperature.

The invention furthermore relates to the use of a calcium carbonate or calcium carbonate-containing filler mixture which, through treatment with a surface-coating agent based on an unsaturated carboxylic acid, fatty acid, substituted fatty acid, or a salt of this compound or fatty acid derivative having $C_4$ to $C_{14}$, preferably $C_5$ to $C_{12}$, produces a surface coating or surface conversion on part or all of the surface of the calcium carbonate, so that the surface coating comprises alkali metal salts and/or fatty acid alkaline earth metal salts or carboxylates thereof, for controlling the rheology of underseal compositions.

Underseal compositions are generally applied by spraying; the pump pressures used during this operation are very high since the plastisol must be forced out of the storage tank into the delivery lines and then through the nozzle of the spray head, the latter taking place at high speed. High structural viscosities are therefore desirable, i.e. the viscosity is low at high shear rate gradients. After application of the underseal composition to the metal sheeting, it must not flow off or drip off vertical areas, i.e. it must have a high sag resistance, which can be described, inter alia, by measuring the rheology and determining a flow limit. The surface treatment of the calcium carbonate results in a preferred rheology inasmuch as the flow limit increases more quickly relative to the viscosity at high shear rate gradients than is the case, for example, for non-surface-treated calcium carbonates.

Examples of the underseal composition according to the invention

EXAMPLE 1

| | |
|---|---|
| Vinyl chloride homopolymer (paste type) | 70 parts by weight |
| Polyvinyl chloride (microsuspension type) | 30 parts by weight |
| Diethylhexyl phthalate | 55 parts by weight |
| Diisononyl phthalate | 60 parts by weight |
| Calcium carbonate, surface-treated with the ammonium salt of sorbic acid | 70 parts by weight |
| Basic lead sulfate | 2 parts by weight |
| Polyaminoamide | 4 parts by weight |
| Calcium oxide | 5 parts by weight |

EXAMPLE 2

| | |
|---|---|
| Vinyl chloride homopolymer (paste type) | 30 parts by weight |
| Vinyl chloride copolymer | 40 parts by weight |
| Polyvinyl chloride (microsuspension type) | 30 parts by weight |
| Diethylhexyl phthalate | 50 parts by weight |
| Diisononyl phthalate | 65 parts by weight |
| Calcium carbonate, surface-treated with the ammonium salt of sorbic acid | 70 parts by weight |
| Basic lead sulfate | 2 parts by weight |
| Polyaminoamide | 3 parts by weight |
| Calcium oxide | 5 parts by weight |

The components of the underseal compositions of Examples 1 and 2 (each separately) were mixed and homogenized by means of dissolvers. The underseal compositions produced were tested using a rotation viscosimeter in order to determine the rheological properties. Evaluation of the measurement curves showed a significantly increased flow limit, evaluated by the Bingham method, at a relatively low viscosity at a high shear rate gradient. This means that the underseal composition is easier to pump, due to the high structural viscosity (high structural viscosity is a somewhat low viscosity at a high shear rate gradient), but at the same time does not flow or drip off after application due to the relatively high flow limit. This property profile was hitherto practically not achievable with other fillers, modified or not.

In addition, the underseal compositions were tested for sag resistance (groove in accordance with DIN 52 454 - St - U 26 - 50); excellent sag resistance was found using all methods. All the other requirements of an underseal composition were likewise satisfied (gelling conditions, adhesion).

Preparation of the surface-treated calcium carbonate

The calcium carbonate surface-treated according to the invention was prepared in the manner described below:

The calcium carbonate was precipitated by passing carbon dioxide into an aqueous suspension of 150 g of calcium hydroxide per liter. The final reaction temperature was 70° C. The subsequent surface-treatment was carried out by adding an aqueous emulsion, likewise warmed to 70° C., of sorbic acid, in the form of the ammonium salt. The amount added was selected so that a surface-treatment quantity of 30 g/kg of calcium carbonate resulted. After vigorous stirring, the suspension was filtered, and the surface-coated calcium carbonate obtained was dried at 105° C. and subsequently ground.

COMPARATIVE EXAMPLE 3

Composition as in Example 1. However, the calcium carbonate was surface-treated with fatty acid (technical grade), namely mixtures of stearic, palmitic and oleic acid (ST Edenor 20).

The flow limits and viscosities determined for Example 1 and for Comparative Example 3 can be seen from the table.

| Example | Substances for surface treatment in the form of | Flow limit (Pa) | Viscosity (Pa.s) |
|---|---|---|---|
| 1 | Ammonium sorbate | 403 | 29.4 |
| 3 | Fatty acid (technical grade) | 81 | 8.0 |

What is claimed is:

1. An underseal composition for motor vehicles, comprising
   finely divided vinyl chloride
   (a) a finely divided vinyl chloride homopolymer, copolymer, terpolymer or graft polymer,
   (b) a plasticizer,
   (c) a stabilizer, and
   (d) a filler comprising calcium carbonate particles, wherein at least a part of the surface of said filler is provided with a surface coating comprising a surface treatment agent which comprises an unsaturated monocarboxylic acid or fatty acid having from 4 to 14 carbon atoms with no additional polar substituents, or a salt thereof.

2. A composition as claimed in claim 1, wherein the amount of said surface coating is about 0.3 to 12% by weight, based on the total weight of said filler.

3. A composition as claimed in claim 2, wherein the amount of said surface coating is 1 to 5% by weight, based on the total weight of said filler.

4. A composition as claimed in claim 1, wherein the amount of said surface coating is about 0.3 to 12% by weight, based on the weight of the calcium carbonate particles of said filler.

5. A composition as claimed in claim 4, wherein the amount of said surface coating is 1 to 5% by weight, based on the weight of the calcium carbonate particles of said filler.

6. A composition as claimed in claim 4, wherein said surface coating is applied to at least a portion of said calcium carbonate particles.

7. A composition as claimed in claim 1, wherein said unsaturated monocarboxylic acid or fatty acid contains 5 to 12 carbon atoms.

8. A composition as claimed in claim 1, further comprising an adhesion promoter.

9. A composition as claimed in claim 1, further comprising a dye or colored pigment.

10. A composition as claimed in claim 1, further comprising a solvent or diluent.

11. A composition as claimed in claim 1, wherein said calcium carbonate particles have a mean particle size of about 0.01 $\mu$m to 20 $\mu$m before treatment.

12. A composition as claimed in claim 11, wherein said calcium carbonate particles have a mean particle size of about 0.05 $\mu$m to 5 $\mu$m.

13. A composition as claimed in claim 1, wherein said calcium carbonate particles have a specific surface area before treatment (BET, adsorption using nitrogen) of about 0.5 to 100 $m^2/g$.

14. A composition as claimed in claim 13, wherein said calcium carbonate particles have a specific surface area of 1 to 50 $m^2/g$.

15. A composition as claimed in claim 1, wherein said unsaturated carboxylic acid is a mono- or diunsaturated, conjugated or non-conjugated carboxylic acid, an alkali salt thereof or a mixture thereof.

16. A composition as claimed in claim 15, wherein said unsaturated carboxylic acid is diunsaturated.

17. A composition as claimed in claim 15, wherein said alkali salt is an ammonium salt.

18. A composition as claimed in claim 1, wherein said surface treatment agent comprises from about 40 to 100 parts by weight, based on the weight of the carboxylic acids employed for the surface treatment, of said unsaturated carboxylic acid or fatty acid, or salt thereof, and from zero to about 60 parts by weight of at least one saturated or unsaturated monocarboxylic acid having from 2 to 32 carbon atoms and containing one polar group besides the carboxyl or carboxylate group, or an alkali salt thereof, or humic acid or an alkali salt thereof.

19. A composition as claimed in claim 18, wherein said salt of said unsaturated carboxylic acid or fatty acid is an ammonium salt.

20. A composition as claimed in claim 18, wherein said alkali salts are ammonium salts.

21. A composition as claimed in claim 1, comprising from about 10 to 60 parts by weight of said vinyl chloride homopolymer, copolymer or terpolymer, from about 10 to 60 parts by weight of at least one said plasticizer, from about 1 to 12 parts by weight of at least one additive selected from the group consisting of a dye, a colored pigment, an adhesion promoter, and a stabilizer, and from about 10 to 60 parts by weight of said filler, wherein said filler is provided with a surface coating comprising a surface treatment agent which comprises at least one unsaturated carboxylic acid having from 4 to 14 carbon atoms, or a salt thereof, in an amount from about 0.3 to 12% by weight, based on the total weight of said filler.

22. A composition as claimed in claim 21, wherein said unsaturated carboxylic acid is mono- or diunsaturated.

23. A composition as claimed in claim 21, wherein said salt is an ammonium salt.

24. A composition as claimed in claim 21, comprising from 25 to 45 parts by weight of said vinyl chloride homopolymer, copolymer or terpolymer.

25. A composition as claimed in claim 21, comprising from 20 to 45 parts by weight of said at least one plasticizer.

26. A composition as claimed in claim 21, comprising from 2 to 6 parts by weight of said at least one additive.

27. A composition as claimed in claim 21, comprising from 15 to 40 parts by weight of said filler.

28. A composition as claimed in claim wherein said filler comprises a synthetic surface-coated calcium carbonate.

29. A composition as claimed in claim 28, wherein said calcium carbonate is formed by passing carbon dioxide into a calcium hydroxide suspension and subsequently surface-treated with an alkali metal salt or ammonium salt of an unsaturated carboxylic acid.

30. A composition as claimed in claim 1, wherein said surface coating comprises a calcium salt or an alkali metal salt of sorbic acid.

31. A composition as claimed in claim 30, further comprising an ammonium salt of sorbic acid.

* * * * *